(12) United States Patent
Moore (10) Patent No.: US 7,937,557 B2
(45) Date of Patent: May 3, 2011

(54) SYSTEM AND METHOD FOR INTERCOMMUNICATION BETWEEN COMPUTERS IN AN ARRAY

(75) Inventor: Charles H. Moore, Sierra City, CA (US)

(73) Assignee: VNS Portfolio LLC, Cupertino, CA (US)

( * ) Notice: Subject to any disclaimer, the term of this patent is extended or adjusted under 35 U.S.C. 154(b) by 48 days.

(21) Appl. No.: 10/801,942

(22) Filed: Mar. 16, 2004

(65) Prior Publication Data

US 2005/0228904 A1    Oct. 13, 2005

(51) Int. Cl.
*G06F 15/76* (2006.01)

(52) U.S. Cl. .............................. 712/11; 712/10; 712/16

(58) Field of Classification Search ............... 712/10–22
See application file for complete search history.

(56) References Cited

U.S. PATENT DOCUMENTS

| | | |
|---|---|---|
| 3,757,306 A | 9/1973 | Boone |
| 3,868,677 A | 2/1975 | Kidd |
| 4,107,773 A | 8/1978 | Gilbreath et al. |
| 4,215,401 A | 7/1980 | Holsztynski et al. |
| 4,215,422 A | 7/1980 | McCray et al. |
| 4,298,932 A | 11/1981 | Sams |
| 4,462,074 A | 7/1984 | Linde |
| 4,589,067 A | 5/1986 | Porter et al. |
| 4,591,980 A | 5/1986 | Huberman et al. |
| 4,593,351 A | 6/1986 | Hong et al. |
| 4,665,494 A | 5/1987 | Tanaka et al. |
| 4,672,331 A | 6/1987 | Cushing |
| 4,739,474 A | 4/1988 | Holsztynski |
| 4,742,511 A | 5/1988 | Johnson |
| 4,789,927 A | 12/1988 | Hannah |
| 4,821,231 A | 4/1989 | Cruess et al. |
| 4,868,745 A | 9/1989 | Patton et al. |
| 4,942,517 A | 7/1990 | Cok |
| 4,943,909 A | 7/1990 | Huang |
| 4,961,167 A | 10/1990 | Kumanoya et al. |
| 4,984,151 A | 1/1991 | Dujari |
| 5,021,947 A | 6/1991 | Campbell et al. |
| 5,029,124 A | 7/1991 | Leahy et al. |
| 5,053,952 A | 10/1991 | Koopman et al. |

(Continued)

FOREIGN PATENT DOCUMENTS

CN    1051995 A    6/1991

(Continued)

OTHER PUBLICATIONS

U.S. Appl. No. 10/365,089, Feb. 12, 2003, Swarztrauber.
*A Digital Background Calibration Technique for Time-Interleaved Analog-To-Digital Converters*, Daihong Fu et al.; IEEE Journal of Solid-State Circuits, vol. 33, No. 12, Dec. 1998.
*Analog to Digital Conversion: Technical Aspects*; Loumeau et al.; Annales des Telecommunications, vol. 57, Nos. 5-6; Jun. 3, 2002; pp. 338-385.
*CMOS Digital Integrated Circuits*, Kang et al., 1999, McGraw-Hill, $2^{nd}$ edition, pp. 549-550.

(Continued)

*Primary Examiner* — Eddie Chan
*Assistant Examiner* — William B Partridge
(74) *Attorney, Agent, or Firm* — Henneman & Associates, PLC; Larry E. Henneman, Jr.

(57) ABSTRACT

A computer array (10) has a plurality of computers (12) for accomplishing a larger task that is divided into smaller tasks, each of the smaller tasks being assigned to one or more of the computers (12). Each of the computers (12) may be configured for specific functions and individual input/output circuits (26) associated with exterior computers (12) are specifically adapted for particular input/output functions. An example of 25 computers (12) arranged in the computer array (10) has a centralized computational core (34) with the computers (12) nearer the edge of the die (14) being configured for input and/or output.

52 Claims, 3 Drawing Sheets

U.S. PATENT DOCUMENTS

| | | | |
|---|---|---|---|
| 5,159,338 A | 10/1992 | Takahashi | |
| 5,218,682 A | 6/1993 | Frantz | |
| 5,317,735 A | 5/1994 | Schomberg | |
| 5,319,757 A | 6/1994 | Moore et al. | |
| 5,359,568 A | 10/1994 | Livay et al. | |
| 5,375,238 A | 12/1994 | Ooi | |
| 5,377,333 A * | 12/1994 | Nakagoshi et al. | 710/317 |
| 5,386,585 A | 1/1995 | Traylor | |
| 5,390,304 A | 2/1995 | Leach et al. | |
| 5,396,609 A | 3/1995 | Schmidt et al. | |
| 5,410,723 A * | 4/1995 | Schmidt et al. | 712/18 |
| 5,434,989 A | 7/1995 | Yamaguchi | |
| 5,440,749 A | 8/1995 | Moore et al. | |
| 5,475,856 A | 12/1995 | Kogge | |
| 5,485,624 A | 1/1996 | Steinmetz et al. | |
| 5,535,393 A * | 7/1996 | Reeve et al. | 717/149 |
| 5,535,417 A | 7/1996 | Baji et al. | |
| 5,550,489 A | 8/1996 | Raab | |
| 5,551,045 A | 8/1996 | Kawamoto et al. | |
| 5,581,767 A | 12/1996 | Katsuki et al. | |
| 5,630,154 A | 5/1997 | Bolstad et al. | |
| 5,649,198 A | 7/1997 | Shibata et al. | |
| 5,657,485 A | 8/1997 | Streitenberger et al. | |
| 5,673,423 A | 9/1997 | Hillis | |
| 5,692,197 A | 11/1997 | Narad et al. | |
| 5,706,491 A | 1/1998 | McMahan | |
| 5,717,943 A | 2/1998 | Barker et al. | |
| 5,727,194 A | 3/1998 | Shridhar et al. | |
| 5,737,628 A * | 4/1998 | Birrittella et al. | 712/11 |
| 5,740,463 A | 4/1998 | Oshima et al. | |
| 5,752,259 A | 5/1998 | Tran | |
| 5,765,015 A | 6/1998 | Wilkinson et al. | |
| 5,784,602 A * | 7/1998 | Glass et al. | 712/220 |
| 5,826,101 A | 10/1998 | Beck et al. | |
| 5,832,291 A | 11/1998 | Rosen et al. | |
| 5,867,330 A | 2/1999 | Tanaka | |
| 5,893,148 A | 4/1999 | Genduso et al. | |
| 5,911,082 A | 6/1999 | Monroe et al. | |
| 5,937,202 A * | 8/1999 | Crosetto | 712/19 |
| 5,944,814 A | 8/1999 | McCulloch et al. | |
| 6,003,128 A | 12/1999 | Tran | |
| 6,023,753 A * | 2/2000 | Pechanek et al. | 712/18 |
| 6,038,655 A | 3/2000 | Little et al. | |
| 6,057,791 A | 5/2000 | Knapp | |
| 6,081,215 A | 6/2000 | Kost et al. | |
| 6,085,304 A * | 7/2000 | Morris et al. | 712/22 |
| 6,092,183 A | 7/2000 | Takewa et al. | |
| 6,094,030 A | 7/2000 | Gunthorpe et al. | |
| 6,101,598 A * | 8/2000 | Dokic et al. | 712/227 |
| 6,112,296 A | 8/2000 | Witt et al. | |
| 6,145,072 A | 11/2000 | Shams et al. | |
| 6,148,392 A | 11/2000 | Liu | |
| 6,154,809 A * | 11/2000 | Ikenaga et al. | 711/108 |
| 6,173,389 B1 * | 1/2001 | Pechanek et al. | 712/24 |
| 6,178,525 B1 | 1/2001 | Warren | |
| 6,192,388 B1 | 2/2001 | Cajolet | |
| 6,219,685 B1 | 4/2001 | Story | |
| 6,223,282 B1 | 4/2001 | Kang | |
| 6,232,905 B1 | 5/2001 | Smith et al. | |
| 6,233,670 B1 | 5/2001 | Ikenaga et al. | |
| 6,236,645 B1 | 5/2001 | Agazzi | |
| 6,279,101 B1 | 8/2001 | Witt et al. | |
| 6,307,425 B1 | 10/2001 | Chevallier et al. | |
| 6,308,229 B1 | 10/2001 | Masteller | |
| 6,353,880 B1 | 3/2002 | Cheng | |
| 6,367,005 B1 | 4/2002 | Zahir et al. | |
| 6,381,705 B1 | 4/2002 | Roche | |
| 6,388,600 B1 | 5/2002 | Johnson et al. | |
| 6,404,274 B1 | 6/2002 | Hosono et al. | |
| 6,404,663 B2 | 6/2002 | Shinozaki | |
| 6,427,204 B1 | 7/2002 | Arimilli et al. | |
| 6,449,709 B1 | 9/2002 | Gates | |
| 6,460,128 B1 * | 10/2002 | Baxter et al. | 712/11 |
| 6,502,141 B1 | 12/2002 | Rawson, III | |
| 6,507,649 B1 | 1/2003 | Tovander | |
| 6,507,947 B1 * | 1/2003 | Schreiber et al. | 717/160 |
| 6,560,716 B1 | 5/2003 | Gasparik et al. | |
| 6,598,148 B1 | 7/2003 | Moore et al. | |
| 6,636,122 B2 | 10/2003 | Tsyrganovich | |
| 6,647,027 B1 | 11/2003 | Gasparik et al. | |
| 6,657,462 B2 | 12/2003 | Dobberpuhl | |
| 6,665,793 B1 | 12/2003 | Zahir et al. | |
| 6,671,112 B2 | 12/2003 | Murakami et al. | |
| 6,725,361 B1 | 4/2004 | Rozas et al. | |
| 6,732,253 B1 | 5/2004 | Redford | |
| 6,782,468 B1 | 8/2004 | Nakazato | |
| 6,825,843 B2 | 11/2004 | Allen et al. | |
| 6,826,674 B1 | 11/2004 | Sato | |
| 6,845,412 B1 | 1/2005 | Boike et al. | |
| 6,898,721 B2 | 5/2005 | Schmidt | |
| 6,930,628 B2 | 8/2005 | Reinhold et al. | |
| 6,937,538 B2 | 8/2005 | Terzioglu et al. | |
| 6,959,372 B1 | 10/2005 | Hobson et al. | |
| 6,966,002 B1 | 11/2005 | Torrubia-Saez | |
| 6,970,895 B2 | 11/2005 | Vaidyanathan et al. | |
| 7,028,163 B2 | 4/2006 | Kim et al. | |
| 7,079,046 B2 | 7/2006 | Tanaka | |
| 7,084,793 B2 | 8/2006 | Elbornsson | |
| 7,131,113 B2 | 10/2006 | Chang et al. | |
| 7,136,989 B2 | 11/2006 | Ishii | |
| 7,155,602 B2 | 12/2006 | Poznanovic | |
| 7,157,934 B2 | 1/2007 | Teifel et al. | |
| 7,162,573 B2 | 1/2007 | Mehta | |
| 7,197,624 B2 | 3/2007 | Pechanek et al. | |
| 7,249,357 B2 | 7/2007 | Landman et al. | |
| 7,269,805 B1 | 9/2007 | Ansari et al. | |
| 7,380,100 B2 | 5/2008 | Shimura et al. | |
| 7,386,689 B2 | 6/2008 | Kirsch | |
| 7,471,643 B2 | 12/2008 | Stansfield | |
| 7,512,728 B2 | 3/2009 | Tseng | |
| 7,528,756 B2 | 5/2009 | Moore et al. | |
| 2002/0004912 A1 | 1/2002 | Fung | |
| 2002/0010844 A1 | 1/2002 | Noel et al. | |
| 2002/0019951 A1 | 2/2002 | Kubo et al. | |
| 2002/0186159 A1 | 12/2002 | Reinhold et al. | |
| 2003/0005168 A1 | 1/2003 | Leerssen et al. | |
| 2003/0009502 A1 | 1/2003 | Katayanggi | |
| 2003/0028750 A1 * | 2/2003 | Hogenauer | 712/10 |
| 2003/0035549 A1 | 2/2003 | Bizjak et al. | |
| 2003/0065905 A1 | 4/2003 | Ishii | |
| 2003/0113031 A1 | 6/2003 | Wal | |
| 2003/0135710 A1 | 7/2003 | Farwell et al. | |
| 2003/0179123 A1 | 9/2003 | DeVilbiss | |
| 2003/0217242 A1 | 11/2003 | Wybenga et al. | |
| 2004/0003219 A1 | 1/2004 | Uehara | |
| 2004/0030859 A1 | 2/2004 | Doerr et al. | |
| 2004/0059895 A1 | 3/2004 | May et al. | |
| 2004/0095264 A1 | 5/2004 | Thomas | |
| 2004/0098707 A1 | 5/2004 | Tang et al. | |
| 2004/0107332 A1 * | 6/2004 | Fujii et al. | 712/16 |
| 2004/0143638 A1 | 7/2004 | Beckmann et al. | |
| 2004/0215929 A1 | 10/2004 | Floyd et al. | |
| 2004/0250046 A1 * | 12/2004 | Gonzalez et al. | 712/11 |
| 2005/0027548 A1 | 2/2005 | Jacobs et al. | |
| 2005/0034029 A1 | 2/2005 | Ramberg et al. | |
| 2005/0114565 A1 | 5/2005 | Gonzalez et al. | |
| 2005/0149693 A1 | 7/2005 | Barry | |
| 2005/0182581 A1 | 8/2005 | Hashemian | |
| 2005/0196060 A1 | 9/2005 | Wang et al. | |
| 2005/0206648 A1 | 9/2005 | Perry et al. | |
| 2005/0223204 A1 | 10/2005 | Kato | |
| 2005/0237083 A1 | 10/2005 | Bakker et al. | |
| 2005/0257037 A1 | 11/2005 | Elwood et al. | |
| 2006/0059377 A1 | 3/2006 | Sherburne, Jr. | |
| 2006/0082445 A1 | 4/2006 | O'Toole et al. | |
| 2006/0101238 A1 | 5/2006 | Bose et al. | |
| 2006/0149925 A1 | 7/2006 | Nguyen et al. | |
| 2006/0218375 A1 | 9/2006 | Swarztrauber | |
| 2006/0248317 A1 | 11/2006 | Vorbach et al. | |
| 2006/0248360 A1 | 11/2006 | Fung | |
| 2006/0279970 A1 | 12/2006 | Kernahan | |
| 2007/0036150 A1 | 2/2007 | Pounds et al. | |
| 2007/0070079 A1 | 3/2007 | Chung et al. | |
| 2007/0113058 A1 | 5/2007 | Tran et al. | |
| 2007/0192504 A1 | 8/2007 | Moore | |
| 2007/0192566 A1 | 8/2007 | Moore et al. | |
| 2007/0192570 A1 | 8/2007 | Moore | |

| | | | |
|---|---|---|---|
| 2007/0192575 | A1 | 8/2007 | Moore et al. |
| 2007/0192646 | A1 | 8/2007 | Moore |
| 2007/0226457 | A1 | 9/2007 | Moore et al. |
| 2008/0270648 | A1 | 10/2008 | Rible |
| 2008/0270751 | A1 | 10/2008 | Montvelishsky et al. |

FOREIGN PATENT DOCUMENTS

| | | |
|---|---|---|
| DE | 3937807 | 5/1990 |
| EP | 0156654 | 10/1985 |
| EP | 0227319 | 7/1987 |
| EP | 0724221 A2 | 7/1996 |
| EP | 0992896 | 4/2000 |
| EP | 1182544 | 2/2002 |
| EP | 1821211 | 8/2007 |
| GB | 2154343 A | 9/1985 |
| GB | 2299422 A | 10/1996 |
| JP | 60-183645 | 9/1985 |
| JP | 64-012339 | 1/1989 |
| JP | 3-500585 | 2/1991 |
| JP | 03-176757 | 7/1991 |
| JP | 5-081216 | 4/1993 |
| JP | 6-243113 | 9/1994 |
| JP | 2509678 | 4/1996 |
| JP | 8-161282 | 6/1996 |
| JP | 2543306 | 10/1996 |
| JP | 8-288768 | 11/1996 |
| JP | 2000-181878 | 6/2000 |
| JP | 2003-044292 | 2/2003 |
| KR | 10-1999-0036970 | 5/1999 |
| WO | WO97/15001 | 4/1997 |
| WO | WO00/42506 | 7/2000 |
| WO | WO02/12999 | 2/2002 |
| WO | WO02/50700 | 6/2002 |
| WO | WO02/088936 | 11/2002 |
| WO | WO03/019356 | 3/2003 |
| WO | WO2005/091847 | 10/2005 |

OTHER PUBLICATIONS

*Evolvable Platform for Array Processing: A One-Chip Approach*, Girau et al., Microelectronics for Neural, Fuzzy and Bio-Inspired Systems, 1999. MIC Roneuro '99. Proceedings of the Seventh International Conference on Granada, Spain, Apr. 7-9, 1999,Los Alamitos, CA(US) IEEE Computer Soc, US, Apr. 7, 1999, pp. 187-193, XP010329509.
*Field Programmable Processor Arrays*, Nussbaum et al., Evolvable Systems: From Biology to Hardware. Second International Conference, ICES 98 Proceedings, Springer-VerlagBerlin, DE, 1998, pp. 311-322, XP002536744.
*The Evolution Of Forth*; Rather et al; ACM SIGPLAN Notices, vol. 28, No. 3, Mar. 1993.
PCT Application No. PCT/US2005/005140, International Search Report and Written Opinion dated Jun. 17, 2008.
PCT Application No. PCT/US2005/005140, International Preliminary Report on Patentability dated Mar. 5, 2009.
CN Application No. 200580008575.7, Office Action dated Mar. 15, 2010 (English translation).
EP Application No. 05723250.6, European Search Report dated Jul. 31, 2009.
EP Application No. 05723250.6, Office Action dated Mar. 19, 2010.
JP Application No. 2007-503910, Office Action dated Sep. 2, 2009 (English translation).
U.S. Appl. No. 11/810,183, Office Action dated Jun. 23, 2008.
U.S. Appl. No. 11/355,495, Office Action dated Oct. 3, 2007.
U.S. Appl. No. 11/355,495, Office Action dated Jun. 10, 2008.
U.S. Appl. No. 11/355,495, Interview Summary dated Nov. 18, 2008.
U.S. Appl. No. 11/355,495, Office Action dated Feb. 2, 2009.
U.S. Appl. No. 11/355,495, Office Action dated Sep. 24, 2009.
U.S. Appl. No. 11/355,495, Office Action dated Apr. 20, 2010.
U.S. Appl. No. 11/355,495, Interview Summary dated Sep. 29, 2010.
PCT Application No. PCT/US2007/004031, International Search Report and Written Opinion dated Jul. 7, 2008.
PCT Application No. PCT/US2007/004031, International Preliminary Report on Patentability dated Aug. 28, 2008.
EP Application No. 07250648.8, European Search Report dated May 21, 2007.
EP Application No. 07250648.8, Office Action dated Feb. 14, 2008.
EP Application No. 07250648.8, Office Action dated Jul. 15, 2009.
U.S. Appl. No. 11/355,513, Office Action dated Sep. 25, 2008.
U.S. Appl. No. 11/355,513, Office Action dated May 1, 2009.
U.S. Appl. No. 11/355,513, Office Action dated Dec. 28, 2009.
U.S. Appl. No. 11/355,513, Office Action dated Jul. 22, 2010.
U.S. Appl. No. 11/355,513, Interview Summary dated Oct. 12, 2010.
PCT Application No. PCT/US2007/004080, International Search Report and Written Opinion dated May 5, 2008.
PCT Application No. PCT/US2007/004080, International Preliminary Report on Patentability dated Aug. 28, 2008.
CN Application No. 200780000014.1, Office Action dated Jul. 24, 2009 (English translation).
EP Application No. 07250645.4, European Search Report dated Jun. 27, 2007.
EP Application No. 07250645.4, Office Action dated Feb. 14, 2008.
EP Application No. 07250645.4, Notice of Allowance dated Oct. 21, 2009.
U.S. Appl. No. 11/441,784, Restriction Requirement dated Aug. 21, 2007.
U.S. Appl. No. 11/441,784, Office Action dated Nov. 27, 2007.
U.S. Appl. No. 11/441,784, Office Action dated Feb. 19, 2008.
U.S. Appl. No. 11/441,784, Office Action dated Nov. 7, 2008.
U.S. Appl. No. 11/441,784, Interview Summary dated Nov. 9, 2009.
U.S. Appl. No. 11/441,784, Notice of Allowance dated Jan. 27, 2010.
U.S. Appl. No. 11/441,784, Office Action dated Mar. 17, 2010.
U.S. Appl. No. 11/441,784, Amendment Considered Notice dated Apr. 15, 2010.
PCT Application No. PCT/US2007/004030, International Search Report and Written Opinion dated Nov. 10, 2008.
PCT Application No. PCT/US2007/004030, International Preliminary Report on Patentability dated Dec. 18, 2008.
CN Application No. 200780000013.7, Office Action dated Mar. 30, 2010 (English translation).
EP Application No. 07250649.6, Extended European Search Report dated Jul. 2, 2007.
EP Application No. 07250649.6, Office Action dated Feb. 14, 2008.
EP Application No. 07250649.6, Office Action dated Jan. 29, 2010.
EP Application No. 07250649.6, Notice of Allowance dated Jul. 26, 2010.
U.S. Appl. No. 12/803,652, Office Action dated Sep. 22, 2010.
U.S. Appl. No. 11/441,812, Office Action dated Aug. 21, 2007.
U.S. Appl. No. 11/441,812, Restriction Requirement dated Jul. 10, 2008.
U.S. Appl. No. 11/441,812, Office Action dated Apr. 2, 2009.
U.S. Appl. No. 11/441,812, Office Action dated Jan. 15, 2010.
PCT Application No. PCT/US2007/004029, International Search Report and Written Opinion dated Aug. 25, 2008.
PCT Application No. PCT/US2007/004029, International Preliminary Report on Patentability dated Sep. 18, 2008.
CN Application No. 200780000015.6, Office Action dated Dec. 18, 2009 (English translation).
EP Application No. 07250614.0, European Search Report dated Jun. 13, 2007.
EP Application No. 07250614.0, Office Action dated Feb. 18, 2008.
EP Application No. 07250614.0, Office Action dated Jan. 29, 2010.
U.S. Appl. No. 11/441,818, Office Action dated Sep. 5, 2007.
U.S. Appl. No. 11/441,818, Office Action dated Jul. 10, 2008.
U.S. Appl. No. 11/441,818, Office Action dated Apr. 1, 2009.
U.S. Appl. No. 11/441,818, Office Action dated Jan. 5, 2010.
PCT Application No. PCT/US2007/004083, International Search Report and Written Opinion dated Sep. 4, 2008.
PCT Application No. PCT/US2007/004083, International Preliminary Report on Patentability dated Mar. 12, 2009.
EP Application No. 07250646.2, Partial European Search Report dated Jul. 24, 2007.
EP Application No. 07250646.2, Extended European Search Report dated Aug. 25, 2008.
EP Application No. 07250646.2, Office Action dated May 5, 2009.
U.S. Appl. No. 11/653,187, Restriction Requirement dated Oct. 24, 2008.
U.S. Appl. No. 11/653,187, Office Action dated Mar. 13, 2009.
U.S. Appl. No. 11/653,187, Office Action dated Nov. 3, 2009.
U.S. Appl. No. 11/653,187, Office Action dated Jul. 23, 2010.

PCT Application No. PCT/US2007/004082, International Search Report and Written Opinion dated Nov. 10, 2008.
PCT Application No. PCT/US2007/004082, International Preliminary Report on Patentability dated Dec. 31, 2008.
EP Application No. 07250647.0, Partial European Search Report dated Jul. 3, 2007.
EP Application No. 07250647.0, Extended European Search Report dated May 21, 2008.
EP Application No. 07250647.0, Office Action dated Jan. 9, 2009.
U.S. Appl. No. 11/741,649, Office Action dated May 12, 2008.
U.S. Appl. No. 11/741,649, Notice of Allowance dated Feb. 27, 2009.
PCT Application No. PCT/US2008/005336, International Search Report and Written Opinion dated Oct. 9, 2008.
PCT Application No. PCT/US2008/005336, International Preliminary Report on Patentability dated Dec. 28, 2009.
EP Application No. 08251505.7, European Search Report dated Aug. 4, 2008.
EP Application No. 08251505.7, Office Action dated Jul. 15, 2009.
U.S. Appl. No. 11/741,659, Office Action dated Dec. 29, 2008.
U.S. Appl. No. 11/741,659, Office Action dated Sep. 16, 2009.
U.S. Appl. No. 11/741,659, Notice of Allowance dated Jun. 9, 2010.
PCT Application No. PCT/US2008/005335, International Search Report and Written Opinion dated Dec. 8, 2008.
PCT Application No. PCT/US2008/005335, International Preliminary Report on Patentability dated May 29, 2009.
EP Application No. 08251499.3, Office Action dated Aug. 13, 2008.
EP Application No. 08251499.3, Office Action dated May 20, 2009.
*Ambric's New Parallel Processor; Globally Asynchronous Architecture Eases Parallel Programming*; Tom R. Halfhill; Microprocessor Report, Scottsdale, AZ; Oct. 10, 2006; pp. 1-9.
*An Asynchronous Array of Simple Processors for DSP Applications*; Zhiyi et al., Yu; IEEE International Conference Digest of Technical Papers, Feb. 6-9, 2006; pp. 1696-1705.
*An Improved Dynamic Register Array Concept for High-Performance RISC Processors*; Scholz, T. et al.; IEEE; 1995; pp. 181-190.
*An Instruction Buffer for Low-Power DSP*; Brackenbury, M. L. L.; Advanced Research In Asynchronous Circuits And Systems, 2000 (ASYNC 2000) Proceedings, Sixth international Symposium On Eilat, Israel, Apr. 2-6, 2000; Los Alamitos, CA, USA, IEEE Comput. Soc., US; Apr. 2, 2000, pp. 176-186.
*An Ultra Low-Power Processor for Sensor Networks*; Ekanayake et al., V.; Sigplan Notices ACM, vol. 39, No. 11, Nov. 2004; pp. 27-36.
*ASPRO-216: A Standard-Cell Q.D.I. 16-Bit RISC Asynchronous Microprocessor*; Renaudin et al.;Proceedings. International Symposium On Advanced Research In Asychronous Circuits And Systems; Jan. 1, 1989, p. 2231.
*BitSNAP: Dynamic Significance Compression for a Low-Energy Sensor Network Asynchronous Processor*; Ekanayake et al., V.N.; Asynchronous Circuits & Systems, Mar. 14-16, 2005; pp. 144-154.
*B16—Ein Forth Prozessor im FPGA*; Bernd Paysan; INET (Online); Feb. 2, 2003, XP002490986; Retreived from the Internet: url:http://www.jwdt.com/{paysan/b16.pdf> p. 1.
*C18 Colorforth Compiler*; Chuck Moore; EUROFORTH 2001 (Online); Nov. 26, 2001, XP002490985, Schloss Dagstuhl, Saarland, Germany; Retreived from the Internet: url:http://www.complang.tuwien.ac.at/anton/euroforth/ef01/moore01 a.pdf> p. 1.
*Computer Archtecture: a Quantitative Approach*; Hennessy et al., John L.; Morgan Kaufmann Publishers, 3$^{rd}$ Edition, 2003; p. 98.
*Connection Machine Model CM-5 System Overview*; Palmer et al., Thinking Machine Corp., Cambridge, Mass., IEEE Jul. 1992, pp. 474-483.
*Datawave: A Single-Chip Multiprocessor for Video Applications*; Schmidt et al.; IEEE Micro, IEEE Service Center, Los Alamitos, CA; vol. 11, No. 3, Jun. 1, 1991; pp. 22-25, 88.
*Energy Characterization of a Tiled Architecture Processor with On-Chip Networks*; Kim, J.S.; Proceedings of the 2003 International Symposium on Low Power Electronics & Design, Aug. 25-27, 2003; pp. 424-427.
*Enhanced Serial Port on the 83C51FA*, Intel, Nov. 1987.

*Flits: Pervasive Computing for Processor and Memory Constrained Systems*, Majurski et al., NIST, pp. 31-38; not dated.
*Forth Session—The Evolution of Forth*, Rather et al., Sigplan Notices USA, vol. 28, No. 3, Mar. 1993; pp. 177-199.
*Functionally Asynchronous Array Processor for Morphological Filtering of Grayscale Images*;Robin et al., F.; IEEE Proceedings: Computers and Digital Techniques, vol. 143, No. 5, Sep. 24, 1996; pp. 273-281.
*IEEE Standard for Boot (Initialization Configuration) Firmware: Core Requirements and Practices*, IEEE Std 1275; 1994.
*Introduction to Java's Architecture*, Bill Venners, Artima.com; Jan. 8, 1999, pp. 1-10.
*Itanium Processor Microarchitecture*; Sharangpani, H. et al.: IEEE; 2000; pp. 24-43.
*iWarp: A 100-MPOS, LIW Microprocessor for Multicomputers*; Peterson et al.; IEEE Micro; IEEE Service Center, Los Alamitos, CA; vol. 11, No. 3, Jun. 1, 1991, pp. 26-29, 81-87.
*Low-Power Electronics Design*, Christian Piguet, CRC Press, 2005 pp. 7-1-7-18 (Logic Circuits & Standard Cells—Chapter 7).
*M68HC11 Microcontrollers Reference Manual*, Motorola, Rev.6, Apr. 2002, p. 29-31, 46, 203,234, 549.
*Mikroprozessortechnik*—pp. 528-533; Flik, T.; 2001, Springer Verlag, Berlin; ISBN: 3-540-42042-8; p. 528; figures 8-5a.
*Performance and Power Analysis of Globally Asynchronous Locally Synchronous Multi-Processor Systems*, Zhiyi Yu et al., Emerging VLSI Technologies And Architectures, 2006. IEEE Computer Society Annual Symposium On Klarlsruhe, Germany, Mar. 2-3, 2006, Piscataway, NJ, USA, IEEE, Mar. 2, 2006 pp. 378-383.
*Stack Computers, The New Wave*; Koopman, Jr., Phillip; Mountain View Press, La Honda, CA; 1989.
*Teilzeitarbeit im Prozessor*; Frees, W.; Electronik, WEKA Fachzeitschriftenverlag, Poing, DE, vol. 45, No. 9, Apr. 30, 1996; pp. 100-106.
*The Architecture of the SC32 Forth Engine*; Hayes et al.; Journal of Forth Application And Research, Institute For Applied Forth Research; Rochester, US; vol. 5, No. 4, 1989, pp. 493-506 (p. 500-501 Fig 3).
*The Computer Engineering Handbook*; Oklobdzija, Vojin G.; CRC Press, 2002; Chapter 7: Architectures for Low Power.
*The PASM Project: A Study of Reconfigurable Parallel Computing*; Siegel et al., H.J.; Parallel Architectures, Algorithms and Networks, Jun. 12-14, 1996; pp. 529-536.
*The Raw Microprocessor: A Computational Fabric for Software Circuits & General-Purpose Programs*; Agarwal et al., IEEE Micro, IEEE Service Center, vol. 22, No. 2, Mar. 2002; pp. 25-35.
*Use IRAM For Rasterization*, Kang Y et al., Image Processing, 1998, ICIP 98. Proceedings. 1998; International Conference on Chicago, IL, USA. Oct. 4-7, 1998, Los Alamitos, CA, USA, IEEE Comput. Soc. US, vol. 3, Oct. 4, 1998, pp. 1010-1013.
*VBScript Looping Statements*; W3Schools; www.w3schools.com/vbscript/vbsript_looping.asp; Jul. 2000.
*XP-002488692 (2.1.3 Adressierungsarten und Befehlsformate)*; Flik, T.; 2 Der Mikroprozessortechnik; 2001, Springer, Berlin; ISBN: 3-540-42042-8; pp. 76-84.
*8Xc251SB Embedded Microcontroller User's Manual*, Intel, Feb. 1995, pp. 1-9, 9-438, and sections 9-1 to 9-4.
*25x Emulator*; Chuck Moore; EUROFORTH 2001 (Online); Nov. 26, 2001, XP002490984,Schloss Dagstuhl, Saarland, Germany; Retreived from the Internet: p. 2, para 8; url:http:///www.complang.tuwien.ac.at/anton/euroforth/ef01/moore01b.pdf>.
EP Application No. 05723250.6, Office Action dated Sep. 7, 2010.
JP Application No. 2007-503910, Office Action dated Jan. 4, 2011 (English translation).
U.S. Appl. No. 11/355,495, Notice of Allowance dated Nov. 2, 2010.
U.S. Appl. No. 11/355,513, Notice of Allowance dated Nov. 3, 2010.
U.S. Appl. No. 11/441,812, Notice of Allowance dated Oct. 21, 2010.
U.S. Appl. No. 11/441,818, Notice of Allowance dated Dec. 9, 2010.

* cited by examiner

SYSTEM AND METHOD FOR INTERCOMMUNICATION BETWEEN COMPUTERS IN AN ARRAY

BACKGROUND OF THE INVENTION

1. Field of the Invention

The present invention relates to the field of computers and computer processors, and more particularly to a method and means for connecting computers together such that the overall speed and efficiency of the combined computers is optimized. The predominant current usage of the present inventive computer array is in the combination of multiple computers on a single microchip, wherein cooperation of the computers to achieve a unified object is desirable.

2. Description of the Background Art

In the art of computing, processing speed is a much desired quality, and the quest to create faster computers and processors is ongoing. Since, for any given state of the art, the maximum available processor speed is finite, there have been efforts to use multiple processors or multiple computers to speed up operations. It is known in the art to combine a plurality of computer processors or computers to divide a task or computation, such that the task is achieved in a minimum amount of time. An example is a multi-threading application wherein different program threads are operated upon by different processors.

As discussed above, it is a given that it is desirable to speed up the operation of a computer process. However no prior art method or apparatus has achieved an optimal speed for the performance of many computer operations.

SUMMARY

Accordingly, it is an object of the present invention to provide an apparatus and method for increasing computer processing speed.

It is still another object of the present invention to provide an apparatus and method for providing substantial computing power inexpensively.

It is yet another object of the present invention to provide an apparatus and method for increasing the operational speed of a multi-computer array.

It is still another object of the present invention to provide an apparatus and method for accomplishing computational intensive tasks.

Briefly, a known embodiment of the present invention is an array of computers, each computer having its own memory and being capable of independent computational functions. A task, such as the implementation of a digital radio, a digital stereo preamplifier, a Global Positioning System ("GPS") receiver unit, a radio transceiver, a speech recognition device, or any of many other such functions, is divided into a plurality of sub-operations, and each operation is assigned to one of the computers at initiation of the operation of the array.

In the embodiment of the invention described, the computer array is implemented on a single die, with at least some computers near the edge of the die being configured to accomplish input and output tasks. Connections between the computers are arranged to keep the implementation of the device relatively simple, while minimizing the number of "hops" required to communicate across the array. In a described embodiment, the computers are arranged in a 5 by 5 matrix wherein each of the computers connects directly to three of its neighbor computers by a parallel connection, although other types and quantities of connections are within the scope of the invention.

The inventor has found that, although assigning a separate task initially to each of the computers may result in some idle time for some or all of the computers, the lack of complexity and inherent efficiency of the arrangement will more than make up for any inefficiency caused by such idle time, and the overall speed and ease of the accomplishment of the task is greatly enhanced.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the described objects and/or advantages. Accordingly, the objects and/or advantages described herein are not essential elements of the present invention, and should not be construed as limitations.

DETAILED DESCRIPTION OF THE INVENTION

This invention is described in the following description with reference to the Figures, in which like numbers represent the same or similar elements. While this invention is described in terms of modes for achieving this invention's objectives, it will be appreciated by those skilled in the art that variations may be accomplished in view of these teachings without deviating from the spirit or scope of the present invention. The method form of the invention may be practiced by combining one or more machine readable storage devices containing the code, according to the present invention, with appropriate standard computer hardware to execute the code contained therein.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is an array of individual computers. The inventive computer array is depicted in a diagrammatic view in FIG. 1 and is designated therein by the general reference character 10. The computer array 10 has a plurality (twenty five in the example shown) of computers 12. In the example shown, all of the computers 12 are located on a single die 14. According to the present invention, each of the computers 12 is a generally independently functioning computer, as will be discussed in more detail hereinafter. The computers 12 are interconnected by a plurality (the quantities of which will be discussed in more detail hereinafter) of interconnecting data lines 16. In this example, the data lines 16 are asynchronous high speed parallel data lines, although it is within the scope of the invention that other interconnecting means (such as serial data lines) might be employed for the purpose. In the present embodiment of the array 10, not only is data communication between the computers 12 asynchronous, the individual computers 12 also operate in an asynchronous mode. While this is not a necessary aspect of the invention, it is thought by the inventor to provide important advantages. For example, since a clock signal does not have to be distributed throughout the computer array 12, a great deal of power is saved, and one skilled in the art will know that this is an important advantage. Furthermore, not having to distribute a clock signal eliminates many timing problems that could limit the size of the array 12 or cause other known difficulties.

Figure 1:
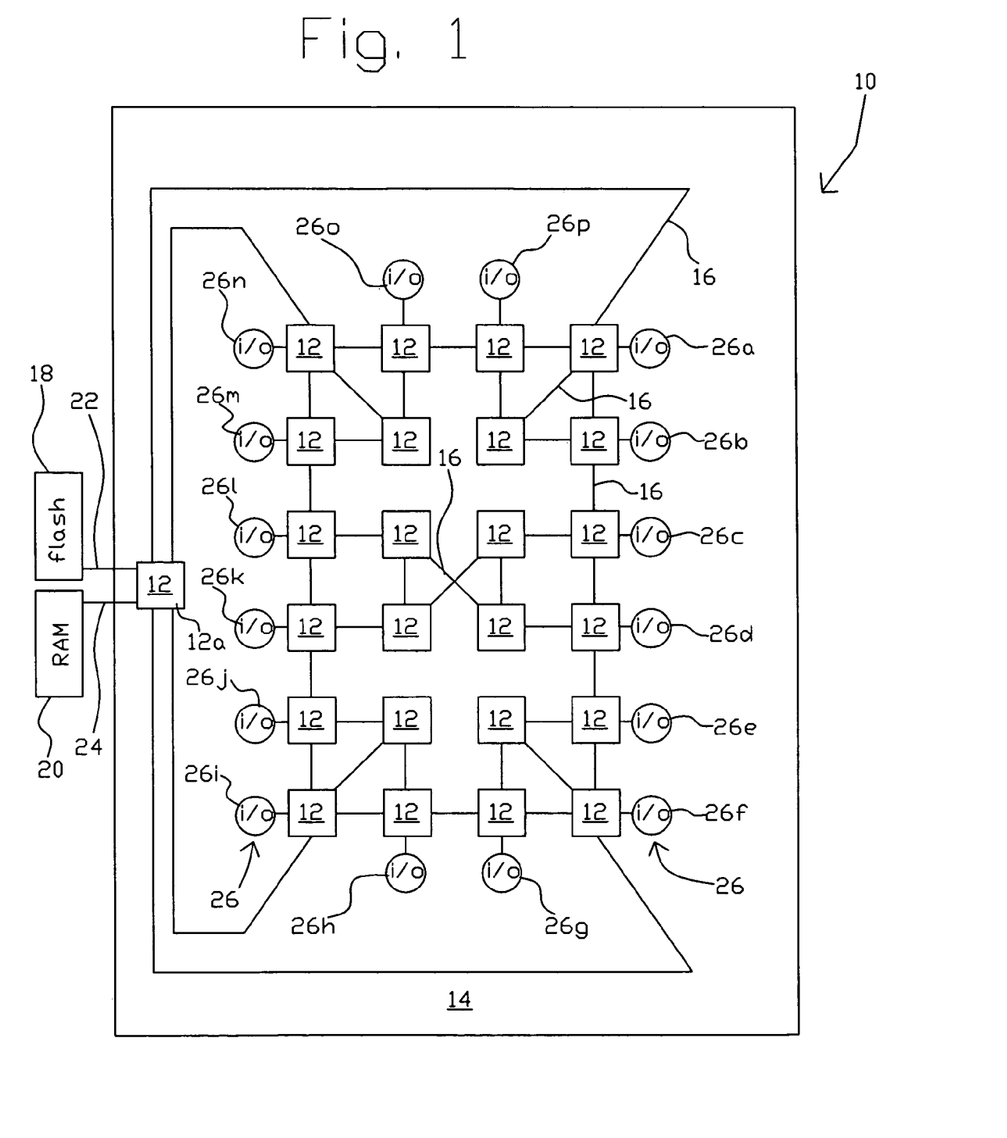
FIG. 1 is a diagrammatic view of a computer array, according to the present invention.

It should be noted that the view of FIG. 1 is not intended to be a layout diagram of the computers 12. Rather, this view illustrates an example of possible interconnections of the computers 12. In the view of FIG. 1 it can be seen that adjacent examples of the computers 12 are connected to three of the neighbor computers 12 by three of the data lines 16. It is thought by the inventor that this quantity of data lines 16 is a reasonable quantity, since it minimizes the necessary quantity of metal layers on the die 14, while providing sufficient data paths that a minimum number of "hops" is required to communicate from one of the computers 12 on the perimeter of the array 10 to even the most interior computer 12, where the term "hops" is used to mean the connections or transfers between the computers 12 through which a signal must travel to move from one of the computers 12 to another computer 12.

Also pictured in the view of FIG. 1 are a flash memory 18 and a RAM 20. In the embodiment shown, the flash memory 18 and the RAM 20 are "off chip", meaning that they are not on the die 14, although it is within the scope of the invention that one or both of these might conceivably be located on the die 14. The flash memory 18 is used to load initial programs into the computers 12 at power up, and the RAM 20 is used in the conventional manner. A memory controller computer 12a controls access to memory in the flash memory 18 and the RAM 20. In the embodiment of the invention described, the flash memory 18 uses a serial data line 22 to transfer data to and through the memory controller computer 12a, while the RAM 20 utilizes a parallel data bus 24, because it is desirable to have as fast as possible a connection to the RAM 20.

The example of the memory controller computer 12a serves to illustrate an important aspect of the present invention. While, according to the present invention, the several computers 12 are either exactly or essentially alike, they each can be configured to perform very distinct and different functions. It should be noted that, according to the present invention, the computers 12 are essentially identical computers in that the structure, circuitry, layout, and operational characteristics are essentially the same. Some examples of minor differences that may be optionally provided will be discussed herein. However, it remains true that the arrays 10, 10a of the present invention are arrays of computers 12 that are all essentially the same. In other words, the present arrays 10, 10a are homogeneous arrays rather than heterogeneous arrays of computers which are designed from the outset to perform different functions. Although the computers 12 of the present homogeneous arrays 10, 10a are all essentially the same, they can be adapted for special purposes by the addition of a small amount of additional circuitry, as will be discussed in more detail hereinafter. Among the many advantages of the homogeneous arrays of the present invention is versatility. According to the present invention, the arrays 10, 10a can be used for a great many different purposes. Further, even if some modification is required or desirable for some special purpose, such modification can be easily accomplished during the manufacture of the devices.

The memory controller computer 12a is just one such example of one of the computers 12 performing a dedicated function. As can be seen in the example of FIG. 1, it is expected that it might be beneficial for the memory controller computer 12a to have a greater quantity of the data lines 16 to connect it to the remainder of the computers 12 than just the quantity of three, previously discussed.

As discussed briefly above, many of the computers 12 in the computer array 10 will have different functions. Accordingly, it is thought that it will be most beneficial for the computers 12 nearest the edge of the die 14 to have input/output functions, since it will be easier to connect to the required pins from those external computers 12 if they are placed on the edge of the die 14. The interior computers 12 (those which are not on the outside of the computer array 10) will, therefore, be used more to accomplish computational and control functions, or other functions which typically require less input/output capability. In the view of FIG. 1, a plurality of input/output circuits 26 are associated with the corresponding computers 12, and provide the input/output functions, which will be discussed in more detail in an example hereinafter. Since the various input/output circuits 26 might each differ, according to their intended respective functions, they are designated by the differentiating designations 26a through 26p inclusive.

Figure 2:
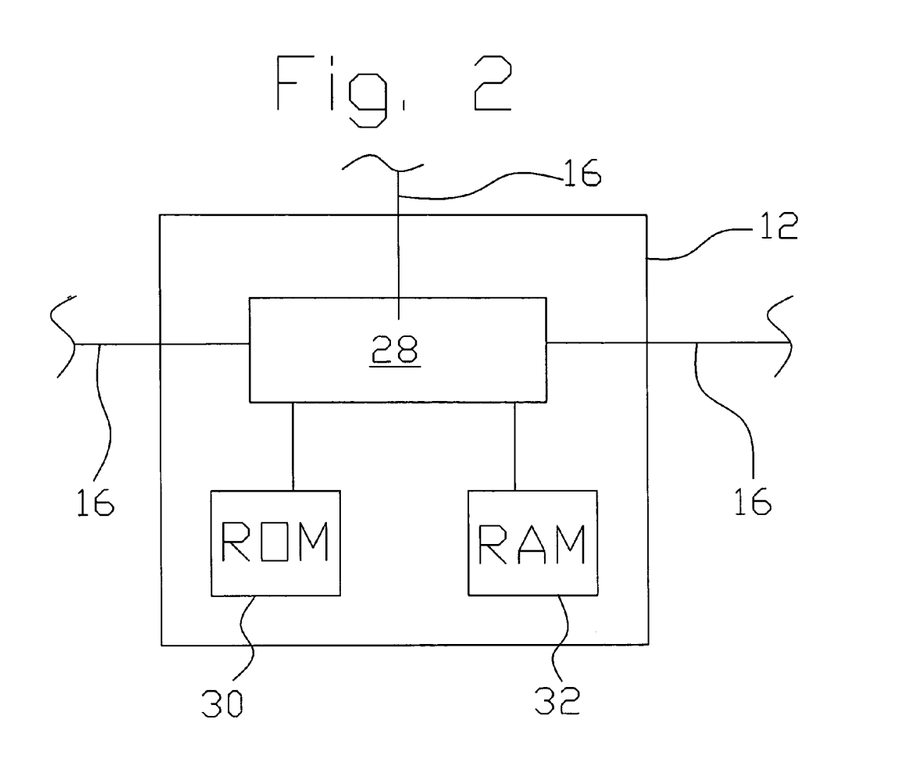
FIG. 2 is a block diagrammatic view of an example of one of the computers of FIG. 1.

FIG. 2 is a block diagrammatic view of an example of one of the computers 12 of FIG. 1. As can be seen in the view of FIG. 2, the computer 12 has a processor 28, a ROM 30 and a RAM 32. As discussed previously herein, the computer 12 is, therefore, capable of performing its assigned function generally independently from all of the other computers 12 in the computer array 10 (FIG. 1).

Figure 3:
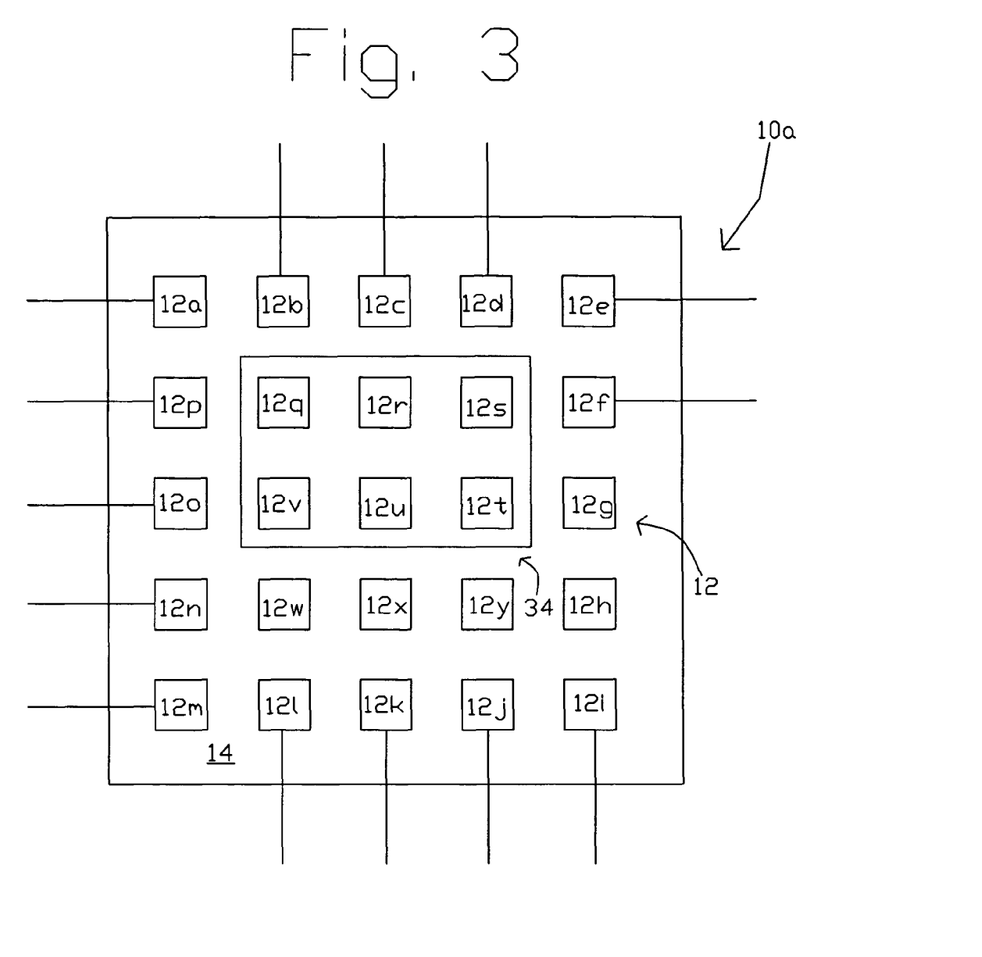
FIG. 3 is a diagrammatic view of a computer array configured for a specific application, according to the present invention.

FIG. 3 is a diagrammatic representation of an example of a computer array 10a showing one possible allocation of the computers 12 therein. The example of the computer array 10a of FIG. 3 differs from the first example of the computer array 10 of FIG. 1 in the allocation of the computers 12, as will be discussed in more detail hereinafter. It should be noted that, as with the view of FIG. 1, the view of FIG. 3 is not intended as a layout diagram and, therefore, is not intended to indicate a necessary physical placement of any of the computers 12. Nevertheless, the example of FIG. 3 is indicative of the fact that it is thought that the 5 by 5 computer array 10a is a useful physical arrangement of the computers 12. According to this arrangement there are sufficiently few computers that not too many are buried deep within the computer array 10a, such that more than a few "hops" would be required to relay data from one of the exterior computers 12, through others of the computers 12, to an interior computer 12. Further, the quantity of twenty five computers is well suited to maximize the usage of available space on the die 14. It is anticipated that, even in many applications where all twenty five of the computers 12 are not required, it may well be cost efficient to use an array such as the example here described. It should be noted that the 5 by 5 arrangement of the computer array 10a and the quantity of twenty five of the computers 12, while thought to be a useful arrangement and quantity (as discussed above), is by no means thought to be the only useful arrangement and quantity. Presently, a 6 by 4 matrix having 24 of the computers 12 in the matrix, as discussed previously in relation to FIG. 1, is thought to have some particular advantages. For example, in an array wherein there are even numbers of the computers 12, the array can be made up of a plurality of 2 by 2 blocks of the computers. In such case, each of the computers 12 can be made to be a mirror image of the computers across from it in the block. This might make easier the task of computer design and interconnection layout. Indeed, factors to be discussed in more detail hereinafter dictate that essentially any quantity, from as few as four, up to and including literally thousands of the computers, could be arrayed together according to the present invention. Also, although the example of FIG. 1 shows three of the data lines 16 connecting each of the computers 12 to its neighbors, the inventor believes that another useful arrangement would be to have data lines 16 connecting each of the computers 12 to all of its nearest neighbor computers 12. In such a connection arrangement, the number of data lines 16 connected to each of the computer 12 would vary according to the placement of each computer 12 in the array 10, 10a.

The example computer array 10a of FIG. 3 has the computers 12 assigned to tasks such as might be useful to create a global positioning system ("GPS") receiver. This example of FIG. 3 is presented only as an example of how various tasks might be assigned to the various computers 12. Interconnections are not shown, as they will not be substantially different from the example of FIG. 1, except as might be necessary or desirable to accomplish the specific tasks described.

In the example of FIG. 3 it can be seen that the computer array 10a has a computational core 34 which includes computers 12q through 12v, inclusive. The peripheral computers, 12a through 12p, are configured generally for input and output, as will be described in more detail hereinafter. Note that in the diagrammatic example of FIG. 3 the input/output circuits 26 which were shown separately in FIG. 1 are not shown separately. This is an example of the fact that the input/output circuits 26 may be considered to be variations in the individual computers 12a through 12w. Whether the input/output circuits 26 are shown separately or are included as a part of the variations between the generally similar computers 12a through 12w is merely a difference in the manner of diagrammatic presentation.

In the example of FIG. 3, computer 12i is configured to be a RAM input/output device, while computer 12j is configured to be a flash memory input/output device. By a comparison to the example of FIG. 1, it can be seen that this example shows a variation in that the computer array 10 of FIG. 1 has a single computer 12 for handling the input and output from both the flash memory 18 and the RAM 20 (FIG. 1), while the present example of the computer array 10a divides these tasks between computers 12. Such a variation is typical of many such variations that might be applied to the computer array 10, 10a.

Returning to a discussion of the peripheral computers 12a through 12p, the computers 12a through 12d are configured for input and output to external devices. In the example shown, computers 12a through 12d implement a LAN interface, a USB interface, a Firewire interface, and a wireless interface, respectively. One skilled in the art will be familiar with the pin out and hardware protocols necessary to implement each of these functions in the computers 12a through 12d. Alternatively, one of the computers 12a through 12d could be used to implement a video output. In some applications fewer than the four input/output computers 12a through 12d might be required. For example, in some applications, only a USB interface might be sufficient input/output to external devices.

In the GPS receiver example of FIG. 3, the computer 12e provides a hardware control (which is a digital input and output) for setting parameters of the remainder of the receiver (not shown) external to the computer array 10a. The computer 12f provides hardware monitoring (which is an analog input and output) for monitoring parameters of operational aspects of the receiver. The hardware monitoring and control allows the computer array 10a to determine how well the rest of the GPS receiver is operating, as well as providing a means to set or modify various operating configurations of the rest of the receiver external to the computer array 10a.

Computers 12o and 12p are configured and programmed to sample and process received RF signals (analog to digital conversion) and the computer 12n is configured and programmed to provide reference frequencies for frequency down conversion prior to sampling (digital to analog conversion). Computer 12w and 12x are configured and programmed to decode the forward error corrected ("FEC") bit stream from the GPS signal. The FEC used in GPS signals will be familiar to on skilled in the art of GPS receivers.

Computer 12y and 12h are optionally used for decrypting aspects of the GPS bit stream after reception demodulation. Note that the use of computers 12y and 12h as described is optional because encryption and decryption will not normally be required in a GPS receiver. Although some parts of a GPS signal are encrypted, a commercial receiver will generally not have access to those. However, encryption will be required in a military version of a GPS receiver. Computer 12l is configured and programmed to communicate with additional computer array(s) 10, as may be necessary or desirable.

In the example of the computer array 10a of FIG. 3, computers 12 not specifically discussed above will either be spares (not used), or else could optionally be used to provide additional input and/or output functions and/or redundancy for the other computers 12.

Figure 4:
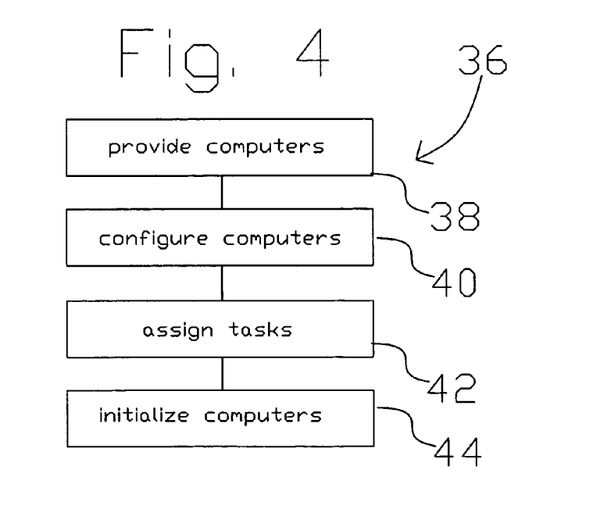
FIG. 4 is a flow diagram depicting an example of the present inventive method.

FIG. 4 is a flow diagram depicting an example of an inventive computer array method 36, which will be understood in light of the preceding discussion of the computer array 10, 10a. In a "provide interconnected computers" 38 operation, the computers 12 described previously herein are provided in the computer array 10 with the interconnecting data lines 16. In a "configure computers for tasks" 40 operation, the provided computers 12 are provided with the distinctive data lines 16 and any other features which might be required to adapt the computer array 10 to a particular application. Of course, the preceding operations 38 and 40 will be accomplished prior to and during the manufacture of the computer array 10. In an "assign tasks to computers" 42 operation, it is decided what portions of a particular task are best accomplished by which of the computers 12, and a program is written to assign and accomplish such tasks. When the computer array 10 is to be used, in an "initialize computers" 44 operation, the individual tasks are loaded into the computer RAM 32 of the computer 12 and operation is begun.

One skilled in the art will recognize that the listed operations of the computer array method 36 are not an exhaustive list of operations which will be used in conjunction with the manufacture and operation of the computer array 10, 10a. As just one example, one skilled in the art will recognize that, upon initialization of the computer array 10, 10a, a test routine will be run.

Various modifications may be made to the invention without altering its value or scope. For example, other quantities or arrangements of the computers 12 than those specifically discussed herein would be entirely within the spirit and scope of the invention. While specific examples of the arrangement and use of the computers 12 have been discussed herein, it is expected that there will be a great many applications for the inventive computer array 10 which have not yet been envisioned. Indeed, it is one of the advantages of the present invention that the inventive method and apparatus may be adapted to a great variety of uses.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive computer array 10, 10a and associated method are intended to be widely used in a great variety of computer applications. It is expected that it they will be particularly useful in computer intensive applications wherein a great number of different but related functions need to be accomplished. It is expected that some of the best applications for the inventive computer array 10, 10a, and associated method, will be where the needed tasks can be divided such that each of the computers 12 has computational requirements which are nearly equal to that of the others. However, even where some of the computers 12 might sometimes, or even always, be working at far less than their maximum capabilities, the inventor has found that the overall efficiency and speed of the computer array 10, 10a will generally exceed that of prior art computer arrays wherein tasks might be assigned dynamically.

It should be noted that there might be many applications wherein it would be advantageous to have more than one of the computer arrays 10, 10a. One of many such possible examples would be where a digital radio might require a GPS input. In such an example the radio might be implemented by one computer array 10, which receives input from a separate computer array 10 configured to accomplish the function of a GPS.

It should further be noted that, although the computers 12 may be optimized to do an individual task, as discussed in the examples above, if that task is not needed in a particular application, the computers 12 can easily be programmed to perform some other task, as might be limited only by the imagination of the programmer.

It is anticipated that the present inventive computer array 10, 10a will best be implemented using the Forth computer language, which is inherently segmented to readily divide tasks as required to implement the invention. Color Forth is a recent variation of the Forth language which would be equally applicable.

Since the computer array 10, 10a and computer array method 36 of the present invention may be readily produced and integrated with existing tasks, input/output devices, and the like, and since the advantages as described herein are provided, it is expected that they will be readily accepted in the industry. For these and other reasons, it is expected that the utility and industrial applicability of the invention will be both significant in scope and long-lasting in duration.

CORRESPONDENCE CHART

10 computer array
12 computer
12a memory controller computer
14 die
16 data line
18 flash memory
20 RAM
22 serial data line
24 parallel data bus
26a through 26p input/output circuits
28 processor
30 ROM
32 computer RAM
34 computational core
36 computer array method
38 provide interconnected computers
40 configure computers for tasks
42 assign tasks to computers
44 initialize computers

I claim:

1. A computer array, comprising:
   a plurality of computers integrated on a unitary substrate, each of the plurality of computers including read-only memory for storing instructions, random access memory for storing data and instructions, and a processor for executing the instructions; and
   a plurality of data paths connecting the computers, the data paths being dedicated for communication between associated pairs of the computers; and wherein,
   at least some of the computers are assigned a task different from that assigned to the other computers;
   intercommunication between one of the plurality of computers and a nearest neighbor computer connected to the one of the plurality of computers via one of the data paths is carried out by the execution of the instructions by the processors of the one of the plurality of computers and the nearest neighbor computer; and
   intercommunication between the one of the plurality of computers and a non-nearest neighbor computer must be carried out by the execution of the instructions by the processors of the one of the plurality of computers and the nearest neighbor computer.

2. The computer array of claim 1, wherein:
   each of the computers is assigned a task different from that of the other computers.

3. The computer array of claim 1, wherein:
   at least some of the computers are configured for specific input functions, whereby the computers configured for specific input functions can receive data from an external device and communicate the received data to other computers of the array.

4. The computer array of claim 1, wherein:
   at least some of the computers are configured for specific output functions, whereby the computers configured for specific output functions can receive data from other computers in the array and communicate the received data to an external device.

5. The computer array of claim 1, wherein:
   communication between the computers is asynchronous.

6. The computer array of claim 1, wherein:
   communication between the computers is via a plurality of parallel data lines.

7. The computer array of claim 1, wherein:
   each of the computers is wired to communicate with at least three of the plurality of computers.

8. The computer array of claim 1, wherein:
   the quantity of the computers is 25.

9. The computer array of claim 1, wherein:
   the computers are physically arrayed in a 5 by 5 array.

10. The computer array of claim 1, wherein:
at least some of the computers are physically arrayed in a 4 by 6 array.

11. The computer array of claim 1, wherein:
the quantity of the computers along each side of the array is an even number.

12. The computer array of claim 1, wherein:
at least one, but not all, of the computers is in direct communication with an external memory source.

13. The computer array of claim 1, wherein:
at least one of the computers communicates data from an external memory source to at least one other of the plurality of computers.

14. A method for performing a computerized job, comprising:
providing a plurality of computers integrated in a unitary substrate and interconnected via discrete sets of data lines, each set of data lines being dedicated to a particular pair of the computers;
assigning a different task to at least some of the computers; and
executing the tasks on the assigned computers; and wherein
each of the plurality of computers includes read-only memory for storing instructions, random access memory for storing data and instructions, and a processor for executing the instructions;
intercommunication between one of the plurality of computers and a nearest neighbor computer connected to the one of the plurality of computers via one of the sets of data lines is carried out by the execution of the instructions by the processors of the one of the plurality of computers and the nearest neighbor computer; and
intercommunication between the one of the plurality of computers and a non-nearest neighbor computer must be carried out by the execution of the instructions by the processors of the one of the plurality of computers and the nearest neighbor computer.

15. The method of claim 14, wherein:
at least one of the computers is assigned to communicate with an external flash memory.

16. The method of claim 14, wherein:
at least one of the computers is assigned to communicate with an external random access memory.

17. The method of claim 14, wherein:
at least one of the computers accomplishes an input/output function by transferring information between another of the computers and an external device.

18. The method of claim 14, wherein:
one of the computers routes assignments to the remainder of the computers.

19. A computer array, comprising:
a plurality of computers on an integrated circuit chip, each of the plurality of computers including read-only memory for storing instructions, random access memory for storing data and instructions, and a processor for executing the instructions; and
a plurality of data connections between the computers, each of the data connections being directly accessible to no more than two of the computers; and wherein
at least some of the computers are programmed to perform different functions;
communication via each of the plurality of data connections is carried out by the execution of the instructions by the processors of the no more than two computers associated with each data connection;
communication between one of the plurality of computers and a nearest neighbor computer connected to the one of the plurality of computers via one of the data connections is carried out by the execution of the instructions by the processors of the one of the plurality of computers and the nearest neighbor computer; and
communication between the one of the plurality of computers and a non-nearest neighbor computer must be carried out through the processors of the one of the plurality of computers and the nearest neighbor computer.

20. The computer array of claim 19, wherein:
the different functions work together to accomplish a task.

21. The computer array of claim 19, wherein:
each of the functions is programmed into the respective computers when the computer array is initialized.

22. The computer array of claim 19, wherein:
communication between the computers is asynchronous.

23. A method for accomplishing a task using a plurality of computers, comprising:
providing the plurality of computers on an integrated substrate and interconnected by data lines, each of the data lines being accessible to no more than two of the computers;
dividing a task into operational components and assigning each of the operational components to one of the computers;
programming at least some of the computers to accomplish each of the operational components; and
executing the operational components on the assigned computers; and wherein
each of the plurality of computers includes read-only memory for storing instructions, random access memory for storing data and instructions, and a processor for executing the instructions;
communication via each of the data lines is carried out by the execution of the instructions by the processors of the no more than two computers having access to the data line;
communication between one of the plurality of computers and a nearest neighbor computer connected to the one of the plurality of computers via one of the data lines is carried out by the execution of the instructions by the processors of the one of the plurality of computers and the nearest neighbor computer; and
communication between the one of the plurality of computers and a non-nearest neighbor computer must be carried out by the execution of the instructions by the processors of the one of the plurality of computers and the nearest neighbor computer.

24. The method for accomplishing a task of claim 23, wherein:
the operational components are operations used in accomplishing functions of a global positioning system receiver.

25. The method for accomplishing a task of claim 23, wherein:
before the task is begun, programming the computers to accomplish each of the operational components.

26. The method for accomplishing a task of claim 23, wherein:
the computers are arranged in a computer array.

27. The computer array of claim 1, wherein:
the computers operate internally in an asynchronous manner.

28. The computer array of claim 1, wherein:
at least one of the read-only memory and the random access memory in each of the computers is dedicated memory.

29. The computer array of claim 1, wherein:
each of the computers is an independently functioning computer.

30. The computer array of claim 1, wherein:
the computers operate internally in an asynchronous manner; and
the computers communicate with each other asynchronously.

31. The computer array of claim 30, wherein:
at least one of the read-only memory and the random-access memory in each of the computers is dedicated memory.

32. The computer array of claim 1, wherein:
the computers are the same with respect to at least one of structure, circuitry, layout, and operational characteristics.

33. The computer array of claim 32, wherein:
a first one of the computers is directly adjacent a second one of the computers; and
the first one of the computers is a mirror image of the second one of the computers.

34. A computer array, comprising:
a plurality of computers integrated on a substrate, each of the plurality of computers including read-only memory for storing instructions, random access memory for storing data and instructions, and a processor for executing the instructions; and
a plurality of dedicated data paths connecting pairs of the computers; and wherein
at least some of the computers are assigned a task different from that assigned to the other computers;
at least some of the computers include dedicated memory for the exclusive use of an associated one of the computers;
intercommunication between one of the plurality of computers and a nearest neighbor computer connected to the one of the plurality of computers via one of the data paths is carried out by the execution of the instructions by the processors of the one of said plurality of computers and the nearest neighbor computer; and
intercommunication between the one of the plurality of computers and a non-nearest neighbor computer must be carried out by the execution of the instructions by the processors of the one of the plurality of computers and the nearest neighbor computer.

35. A computer array, comprising:
a plurality of computers on a unitary substrate, the computers operating asynchronously; and
a plurality of data paths between the computers, each of the data paths facilitating communication between no more than two of the computers; and wherein
at least some of the computers are assigned a task different from that assigned to the other computers;
each of the plurality of computers includes read-only memory for storing instructions, random access memory for storing data and instructions, and a processor for executing the instructions;
communication between one of the plurality of computers and a nearest neighbor computer connected to the one of the plurality of computers via one of the data paths is carried out through by the execution of the instructions by the processors of the one of the plurality of computers and the nearest neighbor computer; and
communication between the one of the plurality of computers and a non-nearest neighbor computer must be carried out by the execution of the instructions by the processors of the one of the plurality of computers and the nearest neighbor computer.

36. The computer array of claim 35, wherein:
the computers communicate with each other asynchronously.

37. The computer array of claim 1, wherein:
the plurality of computers includes at least twenty-four computers.

38. The computer array of claim 1, wherein:
data communicated within the array from a first one of the computers to a second one of the computers must necessarily pass through at least one of the other computers.

39. The computer array of claim 38, wherein:
data communicated within the array from the first one of the computers to the second one of the computers must necessarily pass through at least two of the other computers.

40. The computer array of claim 1, wherein:
at least some of the computers are programmed to function as an input and/or output interface between an external device and other computers of the array.

41. The computer array of claim 1, wherein:
the computer array is a homogeneous array.

42. A computer array, comprising:
a plurality of computers each hard wired to communicate with at least three of the plurality of computers; and
a plurality of data paths connecting the computers, each of the data paths being dedicated to an adjacent pair of the computers; and wherein,
at least some of the computers are assigned a task different from that assigned to the other computers;
each of the plurality of computers is integrated on a unitary substrate;
each of the plurality of computers includes read-only memory for storing instructions, random access memory for storing data and instructions, and a processor for executing the instructions;
communication between one of the plurality of computers and a nearest neighbor computer connected to the one of the plurality of computers via one of the data paths is carried out by the execution of the instructions by the processors of the one of the plurality of computers and the nearest neighbor; and
communication between the one of said plurality of computers and a non-nearest neighbor computer must be carried out by the execution of the instructions by the processors of the one of the plurality of computers and the nearest neighbor computer.

43. The computer array of claim 42, wherein:
every one of the computers of the array is hard wired to communicate with at least three of the plurality of computers.

44. The computer array of claim 42, wherein:
every one of the computers is hard wired to at least three data paths; and
each of the three data paths is coupled to a neighboring one of the computers or provides a connection to an external device.

45. A computer array, comprising:
a plurality of computers each hard wired to communicate with at least three of the plurality of computers; and
a plurality of data paths connecting the computers, each of the data paths being connected to no more than two of the computers; and wherein, at least some of the computers are assigned a task different from that assigned to the other computers; and wherein each of the plurality of computers is integrated on a unitary substrate;

each of the plurality of computers includes read-only memory for storing instructions, random access memory for storing data and instructions, and a processor for executing the instructions;

communication between one of said plurality of computers and a nearest neighbor computer connected to the one of the plurality of computers via one of the data paths is carried out by the execution of the instructions by the processors of the one of the plurality of computers and the nearest neighbor computer; and communication between the one of the plurality of computers and a non-nearest neighbor computer must be carried out by the execution of the instructions by the processors of the one of the plurality of computers and the nearest neighbor computer.

46. The computer array of claim 45, wherein:

every one of the computers of the array is hard wired to communicate with at least three of the plurality of computers.

47. The computer array of claim 45, wherein:

every one of the computers is hard wired to at least three data paths; and each of the three data paths is coupled to a neighboring one of the computers or provides a connection to an external device.

48. A computer array, comprising:

at least twenty-four computers integrated in a unitary substrate; and a plurality of data paths connecting the computers, the data paths being dedicated for communication between associated pairs of the computers; and wherein, each of the computers includes dedicated read-only memory for storing instructions, dedicated random access memory for storing data and instructions, and a processor for executing the instructions;

each of the computers is coupled to communicate with at least two of the other computers;

each of the computers operates internally in an asynchronous manner;

each of the computers communicates with the other computers asynchronously;

communication between one of the plurality of computers and a nearest neighbor computer connected to the one of the plurality of computers via one of the data paths is carried out by the execution of the instructions by the processors of the one of the plurality of computers and the nearest neighbor computer; and communication between the one of the plurality of computers and a non-nearest neighbor computer must be carried out by the execution of the instructions by the processors of the one of the plurality of computers and the nearest neighbor computer.

49. A computer array, comprising:

a plurality of computers integrated in a unitary substrate, each of the plurality of computers including read-only memory for storing instructions, random access memory for storing data and instructions, and a processor for executing the instructions; and a plurality of data paths connecting the computers, the data paths being physical, point-to-point links between associated pairs of the computers; and wherein, at least some of the computers are assigned a task different from that assigned to the other computers;

communication between one of the plurality of computers and a nearest neighbor computer connected to the one of the plurality of computers via one of the data paths is carried out by the execution of the instructions by the processors of the one of the plurality of computers and the nearest neighbor computer; and communication between the one of the plurality of computers and a non-nearest neighbor computer must be carried out by the execution of the instructions by the processors of the one of the plurality of computers and the nearest neighbor computer.

50. A computer array, comprising:

a plurality of independently functioning computers arranged in a matrix on a unitary substrate, each of said plurality of computers having at least two nearest neighbor computers; and a plurality of sets of interconnecting dedicated data lines, each individual set of said plurality of sets of data lines being disposed between an individual computer and one of its nearest neighbor computers of said plurality of computers or between said individual computer and an external device, each of said plurality of sets of data lines being connected to no more than two of said plurality of computers;

thereby enabling execution of a plurality of tasks by said plurality of computers, the execution of some of said tasks being different from the execution of others of said tasks; and wherein each of said plurality of computers communicates with at least three others of said plurality of computers within said matrix;

each of the plurality of computers includes read-only memory for storing instructions, random access memory for storing data and instructions, and a processor for executing the instructions;

communication between one of said plurality of computers and one of its nearest neighbor computers is carried out by the execution of said instructions by said processors of said one of said plurality of computers and said one of its nearest neighbor computers; and communication between said one of said plurality of computers and a non-nearest neighbor computer must be carried out by the execution of said instructions by said processors of said one of said plurality of computers and said one of its nearest neighbor computers.

51. A computer array, comprising:

a plurality of independently functioning computers arranged in a matrix on a unitary substrate, each of said plurality of computers having at least two nearest neighbor computers; and a plurality of sets of interconnecting dedicated data lines, each individual set of said plurality of sets of data lines being disposed between an individual computer and one of its nearest neighbor computers of said plurality of computers;

thereby enabling execution of a plurality of tasks by said plurality of computers, the execution of some of said tasks being different from the execution of others of said tasks; and wherein each of said plurality of computers is dedicated to communicate with at least three of said plurality of computers within said matrix;

each of the plurality of computers includes read-only memory for storing instructions, random access memory for storing data and instructions, and a processor for executing the instructions;

communication between said individual computer and said one of its nearest neighbor computers is carried out by the execution of said instructions by said processors of said individual computer and said one of said nearest neighbor computers connected to said set of interconnecting dedicated data lines; and communication between said individual computer and a non-nearest neighbor computer must be carried out by the execution of said instructions by said processors of said individual computer and said one of its nearest neighbor computers.

52. The computer array of claim 1, wherein:

a plurality of separate tasks are assigned to the plurality of computers, each of the separate tasks to be performed by a different one of the plurality of computers; and each separate task accomplishes a function of a subcomponent of a consumer device.

* * * * *